3,301,005
PURGE ARRANGEMENT FOR ABSORPTION
REFRIGERATION SYSTEMS
Keith V. Eisberg, Camillus, N.Y., assignor to Carrier Corporation, Syracuse, N.Y., a corporation of Delaware
Filed Dec. 14, 1965, Ser. No. 513,719
3 Claims. (Cl. 62—475)

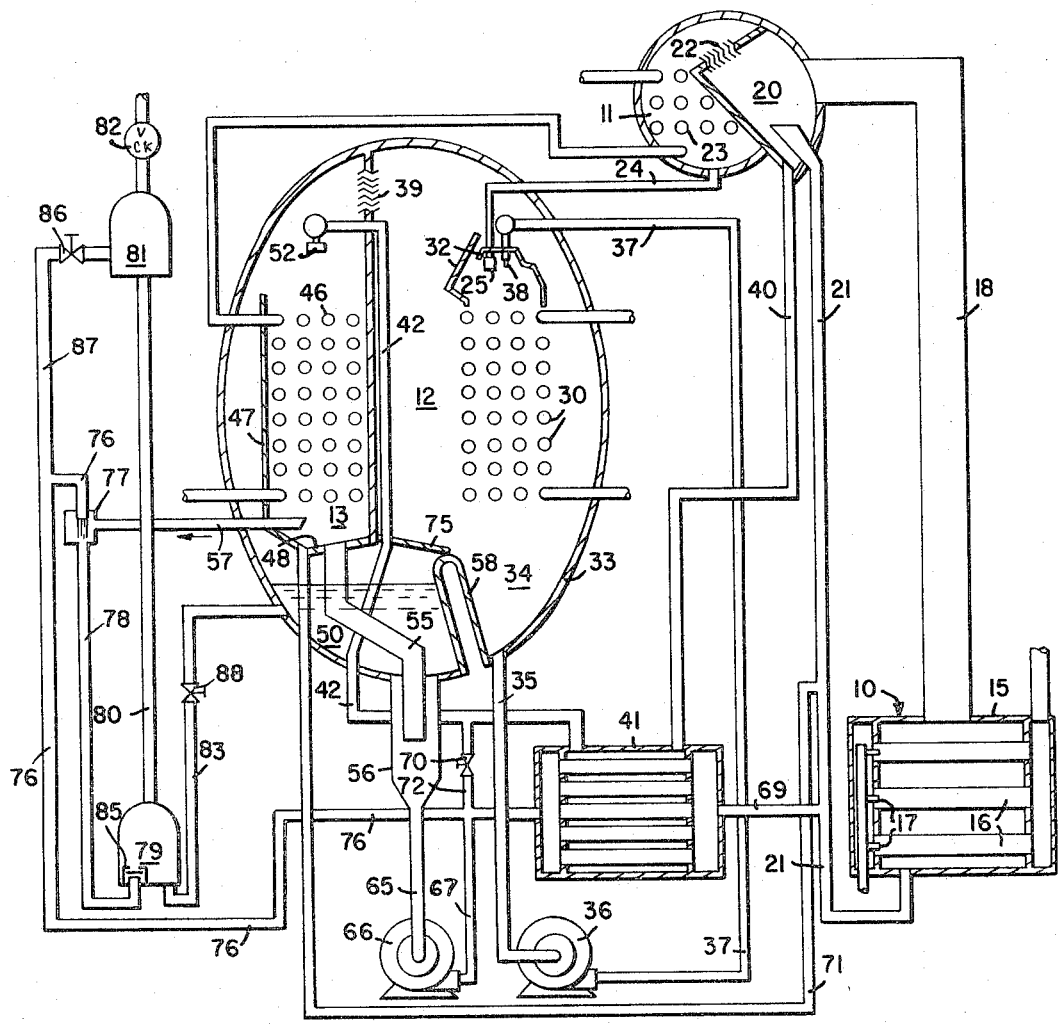

This invention relates to absorption refrigeration systems and, more particularly, to a purge arrangement for removing noncondensible gases from absorption refrigeration systems.

It is known that the capacity of absorption refrigeration machines may be increased by the addition of certain substances known as additives. For example, alcohol is often used with absorption machines employing a lithium bromide-water solution as an absorbent and water as a refrigerant. However, where the absorption machine includes a purge mechanism for extracting noncondensible gases from the system having a separator to separate the noncondensible gases from the solution, the tendency of the separator to separate the relatively low density alcohol additive with the noncondensible gases to be purged from the system results in a continuing loss of additive and a decrease in machine capacity.

It is a principal object of the present invention to provide a new and improved absorption refrigeration system.

It is an object of the present invention to provide an improved purge arrangement for an absorption refrigeration machine employing a relatively low density capacity increasing additive effective to prevent purging of the additive from the machine.

It is a further object of the present invention to provide an absorption refrigeration machine having a purge mechanism incorporating means to prevent the purge mechanism from dispelling relatively low density additive from the machine along with noncondensible gases.

This invention relates to an absorption refrigeration machine comprising a generator section; a condenser section; an evaporator section; and an absorber section interconnected to form a closed system containing an absorbent solution, a refrigerant, and a relatively low density capacity increasing additive, the absorber section including a sump adapted to collect solution relatively weak in absorbing power; pump means for passing the relatively weak solution in the sump to the generator section; a purge line leading from the absorber section; means for drawing noncondensible gases from the absorber section into entrainment with a stream of solution discharging from the pump means; means separating noncondensible gases from the entraining solution, the separating means being adapted to separate the relatively low density additive from the solution with the noncondensible gases; means for expelling the separated noncondensible gases from the system including a storage compartment disposed above the separating means for holding separated noncondensible gases prior to removal into the atmosphere and a conduit leading from the separating means to the storage compartment, the conduit being adapted to contain liquid additive separated from the solution by the separating means; and a solution return line between the separating means and the absorber section sump, the separating means being arranged below the level of the absorber section sump to trap solution in the return line upon shutdown of the machin to seal against the return flow of noncondensible gas from the storage compartment into the absorber section, the minimum height of the gas conduit being greater than the height of the solution return line by an amount sufficient to enable the pressure head of additive in the conduit to balance the pressure head of solution in the return line to prevent passage of additive into the storage compartment.

Other objects and advantages of the invention will be perceived from the following description and drawing in which the figure is a diagrammatic view of an absorption refrigeration system incorporating the purging arrangement of the present invention.

The absorption refrigeration system of the present invention preferably employs water as the refrigerant, a solution of lithium bromide as the absorbent, and a capacity increasing additive such as octyl alcohol (2 ethyl-hexanol.) It is understood that other refrigerants and absorbents may be used. Additionally, other suitable additives may be employed. As used herein, the term "strong solution" refers to a concentrated solution of lithium bromide which is strong in absorbing power; the term "weak solution" refers to a dilute solution of lithium bromide which is weak in absorbing power.

Referring to the attached drawing, there is shown an absorption refrigeration system including a generator section 10, a condenser section 11, an evaporator section 12 and an absorber section 13 interconnected to provide refrigeration. The evaporator and the absorber sections are placed within a horizontally extending, substantially cylindrical shell 33, as hereinafter described.

Generator section 10 comprises a shell 15 having a plurality of fire tubes 16 passing therethrough. Gas jets 17 supply an ignited mixture of gas and air into fire tubes 16 to heat weak solution which is supplied to the generator. A vapor lift tube 18 extends from the top of shell 15. Weak solution is heated in generator section 10 to boil off refrigerant vapor thereby concentrating the weak solution. A mixture of concentrated absorbent solution and refrigerant bubbles rises upwardly through vapor lift tube 18 and passes into separator chamber 20. Equalizer line 21, connecting the bottom of generator 10 and separator 20, serves as an overflow under some conditions and assists in stabilizing the generator boiling.

Preferably, condenser section 11 is contained in the same shell as separator chamber 20 and comprises a plurality of heat exchange tubes 23. Any suitable cooling medium such as water passes through condenser tubes 23. Refrigerant vapor separates from the mixture of absorbent solution passed to separator chamber 20 and passes to condenser section 11 through eliminators 22. The refrigerant vapor is condensed to liquid refrigerant in condenser section 11 by the cooling medium passing through tubes 23. Liquid refrigerant passes from condenser section 11 through condensate line 24 to spray nozzles 25 in evaporator section 12.

Evaporator section 12 comprises a plurality of longitudinally extending heat exchange tubes 30 disposed in a tube bundle located in a region of shell 33. Water or other heat exchange fluid to be cooled is passed through tubes 30 in heat exchange relation with refrigerant supplied over exterior surfaces of the tubes. Heat is absorbed from the water to be cooled by the refrigerant thereby cooling the water in tubes 30 and vaporizing refrigerant on exterior surfaces of the tubes. The vaporized refrigerant passes from evaporator section 12 into absorber section 13 carrying with it the heat absorbed from the water passed through tubes 30. The chilled water may be circulated to a place of use as desired. Baffles 32 are provided to direct refrigerant vapor from the spray nozzles 25 toward the tube bundle in the evaporator section. Eliminators 39 may be provided in the vapor path between absorber section 13 and evaporator section 12.

Shell 33 includes an evaporator sump 34 to receive unevaporated liquid refrigerant which drips off the lower rows of tubes 30. A refrigerant recirculation line 35 receives refrigerant from sump 34, the refrigerant being pumped by pump 36 through line 37 to nozzles 38 where it is again discharged over the top of the tube bundle in the evaporator section.

Strong solution is passed from the lower portion of separator chamber 20 through strong solution line 40 through heat exchanger 41 in which it is placed in heat exchange relation with weak solution passing to the generator, the strong solution flowing from heat exchanger 41 through line 42 to spray nozzles 52 in the absorber, and is distributed by spray nozzles 52 over longitudinally extending tubes 46 to wet the absorber tubes. Absorber section 13 is contained in shell 33.

Cooling water or other suitable cooling medium is passed through tubes 46 to cool the absorbent solution sprayed on their exterior surfaces.

A partition or baffle member 47 is disposed about the sides and bottom of the tube bundle in the absorber section. The lower part 48 of baffle 47 forms a sump funneling weak solution from the absorber section into absorber discharge conduit 55 and solution line 71. Discharge conduit 55 opens into outlet 56.

The liquid refrigerant in sump 34 and the weak solution in sump 50 are at different temperatures. To maintain physical as well as thermal separation therebetween, the base of shell 33 is provided with a longitudinally extending upstanding partition member 58. Baffle 75 is sealingly secured between member 58 and the lower portion of baffle member 47 to complete the separation of evaporator section 12 from absorber section 13.

Purge line 57 opens adjacent the lower portion of the tube bundle in absorber section 13.

Absorbent solution is withdrawn from the absorber section through weak solution line 65 connected to outlet 56 of the absorber section. Weak solution is forwarded by pump 66 through line 67, heat exchanger 41 and line 69 to equalizer line 21 where it passes to generator section 10 for reconcentration. If desired, a portion of the weak solution discharged by pump 66 may be passed through weak solution recirculating line 72 to mix with concentrated absorbent solution in line 42 for discharge through spray nozzles 52. Valve 70 in line 72 regulates the flow of weak solution through recirculating line 72.

Solution line 71, provided between equalizer line 21 and collection sump 48, maintains the proper solution level in generator section 10 when the machine is placed in operation.

Purge line 57 opens into chamber 77. Solution from pump 66 is discharged from line 76 through chamber 77 into a fall tube 78, the stream of liquid solution falling through chamber 77 drawing noncondensible gases from absorber section 13 through purge line 57 into entrainment therewith. The dimensional relationship between solution discharge line 76 and the fall tube 78 is such that the stream of solution emitted from line 76 substantially fills fall tube 78 to prevent escape of noncondensible gases from fall tube 78 into absorber section 13.

Solution and noncondensible gases entrained therewithin pass through fall tube 78 and check valve 85 to separator 79. Check valve 85 prevents flow from separator 79 into fall tube 78. Separator 79 divides the lighter, less dense noncondensible gases from the heavier, more dense motive solution. The separated solution is returned to the absorber section sump 50 from separator 79 by line 83. Noncondensible gases from separator 79 pass through line 80 into storage compartment 81.

To remove noncondensible gases accumulated in storage compartment 81, control valve 86 may be opened to admit solution discharged from pump 66 into storage compartment 81. Valve 86 may be conveniently joined to solution line 76 by line 87. At the same time, control valve 88 in solution return line 83 is closed. With the egress of solution prevented by the closure of valve 88 and check valve 85 in fall tube 78, pressures of the noncondensible gases in compartment 81 rise as solution fills storage compartment 81. At a preset pressure condition, check valve 82 opens to permit escape of the noncondensible gases to the atmosphere. Check valve 82 includes a suitable float actuated control effective to close valve 82 to prevent loss of solution to the atmosphere following exhausting of the noncondensible gases from storage compartment 81. Valve 86 is then closed and valve 88 in line 83 opened to permit solution in storage compartment 81 to return through line 80, separator 79, and line 83 to sump 50.

To obviate possible bleed of noncondensible gases from storage compartment 81 through lines 80, 83 into absorber section 13 at shutdown of the machine, separator 79 is positioned below the level of absorber section sump 50. At shutdown, solution trapped in line 83 establishes a liquid seal isolating absorber section 13 from storage compartment 81.

Separator 79, which separates noncondensible gases from the entraining solution, additionally tends to separate the relatively low density additive from the relatively high density solution. The separated additive accumulates in line 80 where, under the influence of the liquid head in solution return line 83, it may overflow line 80 into storage compartment 81 from whence it is exhausted to the atmosphere with the noncondensible gases. The propensity of separator 79 to separate additive from the solution may be understood when it is realized that the specific gravity of an additive such as octyl alcohol is approximately 0.9 while the specific gravity of the relatively weak absorbent solution is approximately 1.7.

To prevent passage of additive into compartment 81 with consequent loss to the system, the height of line 80 leading from separator 79 to storage compartment 81 is made sufficient to enable a quantity of additive adequate to establish a pressure head equal to the opposing solution pressure head in line 83 to be accumulated in line 80. The minimum height of line 80 is equal to the ratio of the specific gravity of the solution to the specific gravity of the additive times the height of line 83. In a system where octyl alcohol is used as the additive and a lithium bromide-water solution as the absorbent, the minimum height of line 80 is 1.7/0.9 times the height of line 83.

It is understood that a slight excess in additive is added to the system to offset the quantity of additive trapped in line 80. Noncondensible gases separated from the entraining solution by separator 79 rise upwardly through the liquid additive held in line 80 into storage compartment 81.

While I have described a preferred embodiment of this invention, it will be understood that the invention is not limited thereto since it may be otherwise embodied within the scope of the following claims.

I claim:

1. In an absorption refrigeration machine including a generator section, a condenser section, an evaporator section and an absorber section interconnected to form a closed system containing an absorbent solution, a refrigerant, and a relatively low density capacity increasing additive, said absorber section including a sump adapted to collect solution relatively weak in absorbing power, and pump means for passing said relatively weak solution in said sump to said generator section, the combination of a purge line leading from said absorber section; means for drawing noncondensible gases from said absorber section into entrainment with a stream of solution discharging from said pump means; means separating noncondensible gases from said entraining solution, said separating means being adapted to separate relatively low density additive from said solution with said noncondensible gases; means for expelling said separated noncondensible gases from said system including a storage compartment disposed above said separating means for holding separated noncondensible gases prior to removal into the atmosphere, and a conduit leading from said separating means to said storage compartment, said conduit being adapted to contain liquid additive separated from said solution by said separating means; and a solution return line between said separating means and said absorber section sump, said separating means being arranged below the level of said absorber section sump to trap solution in said return line upon shutdown of said machine to seal against the return flow of noncondensible gases from said storage compartment into said absorber section, the minimum height of said conduit being greater than the height of said solution return line by an amount sufficient to enable the pressure head of additive in said conduit to balance the pressure head of solution in said return line to prevent passage of additive into said storage compartment.

2. An absorption refrigeration machine according to claim 1 in which the minimum height of said gas conduit equals the ratio of the specific gravity of said solution to the specific gravity of said additive times the height of said solution return line.

3. An absorption refrigeration machine according to claim 1 in which said additive comprises octyl alcohol.

References Cited by the Examiner

UNITED STATES PATENTS

| | | | |
|---|---|---|---|
| 3,081,605 | 3/1963 | Leonard | 62—85 |
| 3,131,546 | 5/1964 | Osborne | 62—475 X |
| 3,138,005 | 6/1964 | Bourne et al. | 62—85 |
| 3,167,928 | 2/1965 | Swearingen | 62—475 X |

LLOYD L. KING, *Primary Examiner.*